US009913008B1

(12) United States Patent
Keyworth et al.

(10) Patent No.: US 9,913,008 B1
(45) Date of Patent: Mar. 6, 2018

(54) MULTICAST WAVELENGTH SELECTIVE SWITCH

(71) Applicant: Lumentum Operations LLC, Milpitas, CA (US)

(72) Inventors: Barrie P. Keyworth, Ottawa (CA); Paul Colbourne, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/615,415

(22) Filed: Jun. 6, 2017

(51) Int. Cl.
| G02B 6/28 | (2006.01) |
| H04Q 11/00 | (2006.01) |
| H04J 14/02 | (2006.01) |
| G02B 6/32 | (2006.01) |
| G02B 6/35 | (2006.01) |

(52) U.S. Cl.
CPC ........... *H04Q 11/0005* (2013.01); *G02B 6/32* (2013.01); *G02B 6/354* (2013.01); *G02B 6/3518* (2013.01); *H04J 14/0212* (2013.01); *H04J 14/0224* (2013.01); *H04Q 11/0062* (2013.01)

(58) Field of Classification Search
CPC . H04J 14/02; H04Q 11/0005; G02B 6/12007; G02B 6/2938; G02B 6/29395; G02B 6/28
See application file for complete search history.

(56) References Cited

U.S. PATENT DOCUMENTS

| 8,300,995 B2 | 10/2012 | Colbourne | |
| 8,885,111 B2 * | 11/2014 | Uehara | G02F 1/1326 345/103 |
| 8,923,667 B2 * | 12/2014 | Cohen | G02B 6/351 385/16 |
| 9,069,139 B2 | 6/2015 | McLaughlin et al. | |

* cited by examiner

*Primary Examiner* — Jennifer Doan
(74) *Attorney, Agent, or Firm* — Harrity & Harrity, LLP

(57) ABSTRACT

A wavelength selective switch (WSS) may include a first port array including input ports, each to launch a respective beam of light, and a dispersive element to separate, in a lateral direction, a beam of light, launched by one of the input ports, into dispersed wavelength channel sub-beams. The WSS may include a switching array to direct the dispersed wavelength channel sub-beams, at respective angles in a vertical direction. The dispersive element may converge groups of dispersed wavelength channel sub-beams in the lateral direction to form wavelength channel sub-beams. The WSS may include a splitting element to split, in the lateral direction, a wavelength channel sub-beam, of the wavelength channel sub-beams, into split wavelength channel sub-beams. The WSS may include switching elements to direct the split wavelength channel sub-beams at respective angles in the vertical direction, and output ports associated with the switching elements.

20 Claims, 8 Drawing Sheets

MULTICAST WAVELENGTH SELECTIVE SWITCH

TECHNICAL FIELD

The present disclosure relates to an add/drop device that allows colorless, directionless, contentionless (CDC) add/drop to be achieved at an optical node and, more particularly, to a hybrid add/drop device, that includes elements of both a M×N wavelength selective switch (WSS) and a multicast switch (MCS) with increased scalability, that allows CDC add/drop to be achieved at an optical node.

BACKGROUND

An optical node (e.g., a node in a dense wavelength division multiplexed (DWDM) optical communications system) may include optical devices (e.g., WSSs, MCSs, and/or the like), that allow the optical node to achieve CDC add/drop. Colorless add/drop refers to wavelength flexibility of the optical node that allows any wavelength (i.e., "color") to be added/dropped on any add/drop port of the optical node. Directionless add/drop refers to directional flexibility of the optical node that allows an added channel to be routed to any direction served by the optical node, or inbound channels from any direction served by the optical node to be routed to a given drop port. Contentionless add/drop refers to port flexibility of the optical node that allows multiple add/drop ports of the optical node to transmit or receive channels of the same wavelength. In such a CDC optical node, multiple wavelengths may be switched to multiple fiber directions, and multiple wavelength channels of the same wavelength can be concurrently routed between a transmitter/receiver of the optical node and a target outbound/inbound optical fiber of the optical node. Thus, the CDC-capable optical node may have increased flexibility and/or operational simplicity as compared to an optical node that cannot achieve CDC add/drop.

SUMMARY

According to some possible implementations, a wavelength selective switch may include a first port array including M (M>1) input ports, each to launch a respective beam of light; a dispersive element to separate a beam of light, launched by one of the M input ports, into L (L>1) dispersed wavelength channel sub-beams, where the L dispersed wavelength channel sub-beams may be separated in a lateral direction; a switching array to direct the L dispersed wavelength channel sub-beams, each at a respective angle in a vertical direction; the dispersive element to converge groups of dispersed wavelength channel sub-beams to form X (X≥1) wavelength channel sub-beams, where the groups of dispersed wavelength channel sub-beams may be converged with respect to the lateral direction, and where at least one of the L dispersed wavelength channel sub-beams may be included in the groups of dispersed wavelength channel sub-beams; a splitting element to split a wavelength channel sub-beam, of the X wavelength channel sub-beams, into K (K>1) split wavelength channel sub-beams, where the K split wavelength channel sub-beams may be split in the lateral direction; K switching elements, each to direct one of the K split wavelength channel sub-beams at a respective angle in the vertical direction; and K output ports, each associated with one of the K switching elements.

According to some possible implementations, an optical device, may include a first port array including a plurality of input ports, each to launch a respective beam of light; a first dispersive element to separate a beam of light, launched by one of the plurality of input ports, into a plurality of dispersed wavelength channel sub-beams, where the plurality of dispersed wavelength channel sub-beams may be separated in a first direction; a switching array to direct the plurality of dispersed wavelength channel sub-beams, each at a respective angle in a second direction, where the second direction may be substantially perpendicular to the first direction; a second dispersive element to converge groups of dispersed wavelength channel sub-beams to form a plurality of wavelength channel sub-beams, where the groups of dispersed wavelength channel sub-beams may be converged with respect to the first direction, and where the groups of dispersed wavelength channel sub-beams may include at least one of the plurality of dispersed wavelength channel sub-beams; a splitting element to split a wavelength channel sub-beam, of the plurality of wavelength channel sub-beams, into a plurality of split wavelength channel sub-beams, where the plurality of split wavelength channel sub-beams may be split in the first direction; a plurality of switching elements, each to direct one of the plurality of split wavelength channel sub-beams at a respective angle in the second direction; and a plurality of output ports, each associated with one of the plurality of switching elements.

According to some possible implementations, a wavelength selective switch, comprising: K input ports, each to launch one of K wavelength channel sub-beams; K switching elements, each to direct one of the K wavelength channel sub-beams at a respective angle in a vertical direction, the respective angles in the vertical direction corresponding to respective desired output ports; a combining element to converge the K wavelength channel sub-beams to form a combined wavelength channel sub-beam, where the K wavelength channel sub-beams may be converged in a lateral direction; a dispersive element to separate the combined wavelength channel sub-beam, into a set of dispersed wavelength channel sub-beams, where each of the set of dispersed wavelength channel sub-beams may receive a deviation in a lateral direction corresponding to a respective wavelength; a switching array to direct the set of dispersed wavelength channel sub-beams, each at a respective angle for coupling to one of M (M>1) output ports; the dispersive element to converge groups of dispersed wavelength channel sub-beams to form a set of output beams, where the groups of dispersed wavelength channel sub-beams may be converged with respect to the lateral direction; and a set of output ports, each to receive one of the set of output beams, the M output ports including the set of output ports.

DETAILED DESCRIPTION

Figure 1:
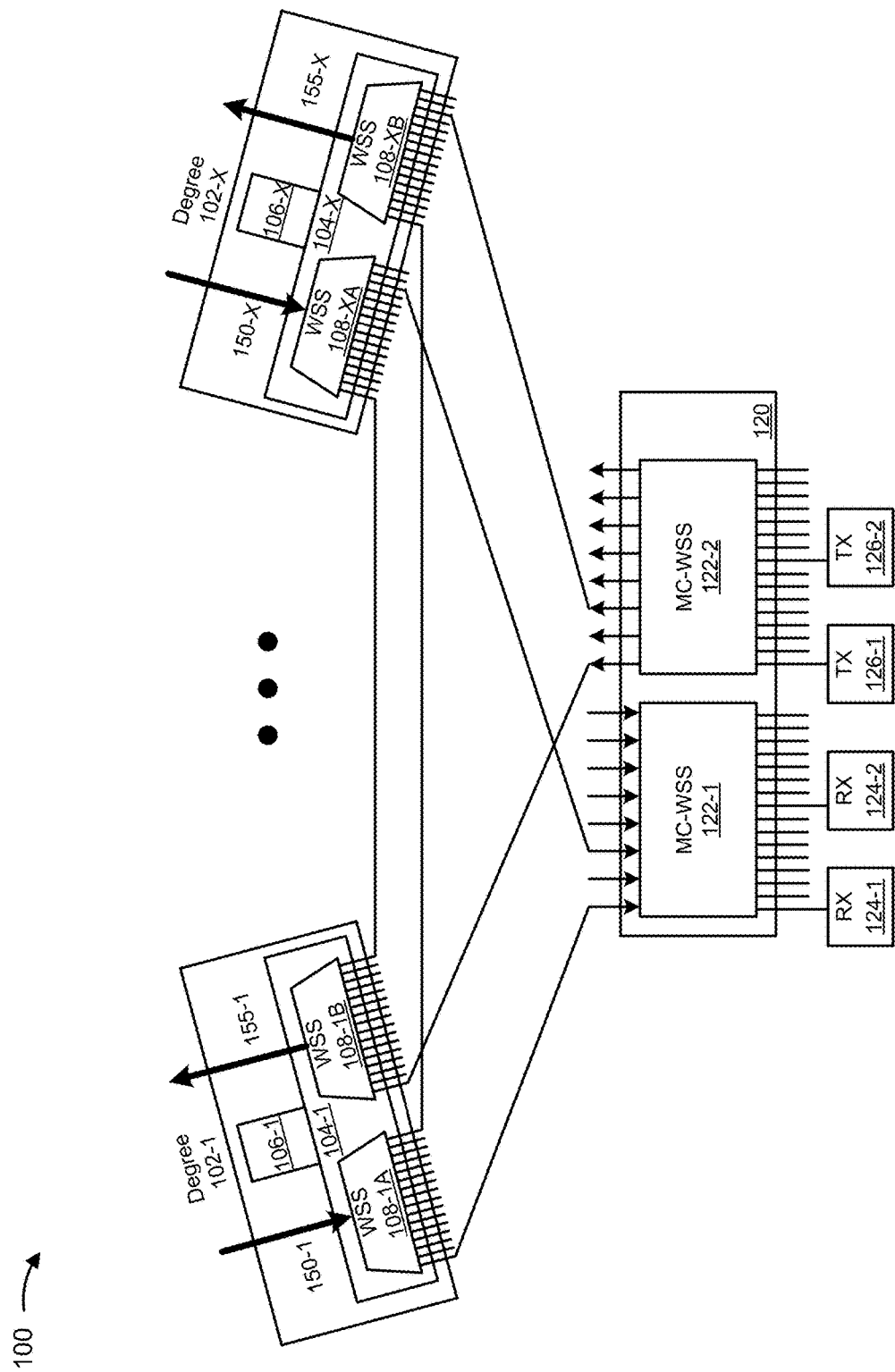
FIG. 1 is a diagram of an optical node capable of achieving CDC add/drop using a multicast WSS (MC-WSS) described herein.

The following detailed description of example implementations refers to the accompanying drawings. The same reference numbers in different drawings may identify the same or similar elements. The implementations described below are merely examples and are not intended to limit the implementations to the precise forms disclosed. Instead, the implementations were selected for description to enable one of ordinary skill in the art to practice the implementations.

In order to achieve CDC add/drop at an optical node, a lineside of the optical node (where optical signals enter/exit the optical node via input/output ports associated with each degree of the optical node) may include pairs of WSSs, where each WSS pair is associated with a respective degree of the optical node. Typically, an add/drop side of the optical node (where optical signals are added/dropped at transmitters/receivers of the optical node) includes one or more add/drop devices. As described above, in order to provide increased flexibility and/or operational simplicity of the optical node (e.g., as compared to an optical node that cannot achieve CDC add/drop), the add/drop devices should allow CDC add/drop to be achieved at the optical node.

Two types of add/drop devices that may allow CDC add/drop to be achieved are a M×N WSS and a MCS (e.g., including M (M>1) input/output ports and N (N>1) output/input ports). These two types of add/drop devices have different impacts on system performance, different optical amplifier requirements, and different technical challenges, as described below. However, in the case of both the M×N WSS and the MCS, technological and/or system performance constraints may limit scaling of M and/or N, which may prevent optical nodes that use M×N WSSs or MCSs as add/drop devices from supporting the overlay of fiber links needed to increase network capacity. Thus, an optical node design that uses M×N WSSs and/or MCSs to achieve CDC may not be capable of scaling in order to satisfy the demand for increased network capacity.

With regard to the M×N WSS, a typical M×N WSS is designed to reduce and/or minimize insertion loss in order to avoid a need for including optical amplifiers on the M ports of the M×N WSS (e.g., since the inclusion of optical amplifiers would increase a cost and/or a complexity of the M×N WSS as compared to a M×N WSS that does not include optical amplifiers). One technique for reducing and/or minimizing insertion loss in a M×N WSS is to use a combination of a liquid crystal on silicon (LCoS) switching array (for flexible routing of individual wavelength channels) and an array of low-loss tiltable micro-electro-mechanical systems (MEMS) mirrors (for selecting an inbound/outbound fiber direction) in the M×N WSS.

In such a case, the M×N WSS would require M wavelength-dispersed images (e.g., each associated with one of M input beams) to be incident on the LCoS switching array, and each of N outputs to be imaged onto a different MEMS mirror of the MEMS array (e.g., each capable of acting as a 1×M selector switch). At a switching plane of the LCoS switching array, only $1/M^{th}$ of the programmable phased-array pixels of the LCoS switching array are available for each wavelength-dispersed image (e.g., since wavelength-dispersed images are assigned to separate regions on the LCoS switching element in order to avoid contention). Here, the LCoS switching array is capable of applying a limited range of steering angles (e.g., less than 10 degrees total) to wavelength channels of a given wavelength-dispersed image, with insertion loss increasing as the applied steering angle increases.

In some cases, in order to reduce and/or minimize such insertion loss, a dispersed input image on the LCoS switching element may be expanded (e.g., in the orthogonal switching direction) in order to reduce a steering angle that needs to be applied by the LCoS switching element. Nonetheless, as the number of M regions needed on the LCoS switching array and the number of N ports to which wavelength channels can be steered increases, the insertion loss of the M×N WSS increases, and the M×N WSS cannot achieve a lowest possible loss. Thus, as required dimensions of such M×N WSSs continue to scale (i.e., as M and N increase) in order to support further optical network growth while also allowing for CDC add/drop, a point may be reached where a M×N WSS (e.g., a 16×64 WSS) will be unable to avoid a need for optical amplifiers.

With regard to the MCS, a typical MCS is designed to include an array of M 1×N optical splitters, followed by a fiber shuffle, and N 1×M selector switches. The optical design of the typical MCS architecture is simpler than that of the typical M×N WSS, but may result in an undesirable amount of insertion loss (e.g., due to beam splitting), thereby necessitating inclusion of optical amplifiers at the M ports of the MCS. In the case of the MCS, a cost and/or a complexity of the optical amplifiers are of concern (rather than avoiding use of optical amplifiers altogether, as with the M×N WSS). However, the cost and complexity of the optical amplifiers depends on an amount of required gain and output power, both of which increase as the dimensions of the MCS scale. Thus, as required dimensions of such MCSs continue to scale in order to support further optical network growth while allowing for CDC add/drop, a point may be reached where the optical amplifiers required in the MCS become impractical or even impossible to implement.

Furthermore, while the optical design of the MCS is simplified as compared to the M×N WSS (e.g., since wavelength filtering is performed by a coherent receiver rather than by the MCS), a greater amount of noise is present in the MCS, which negatively impacts performance of the MCS. Thus, tunable wavelength filters may need to be included in the MCS, which adds additional cost, complexity, and/or loss at the MCS.

Some implementations described herein provide a hybrid add/drop device with improved scalability for supporting growth of an optical network (e.g., as compared to a M×N WSS or a MCS), while allowing CDC add/drop to be achieved at an optical node. In some implementations, the hybrid add/drop device includes elements of both a M×N WSS and a MCS in order to provide improved scalability, as described in further detail below. The hybrid add/drop device is referred to herein as a multicast WSS (MC-WSS).

FIG. 1 is a diagram of an example optical node 100 capable of achieving CDC add/drop using a MC-WSS described herein. As shown in FIG. 1, optical node 100 includes a set of degrees 102-1 through 102-X (X>1). As shown, each degree 102 includes a multiplexing/demultiplexing stage 104 (e.g., 104-1 through 104-X) and an optical channel monitor 106 (e.g., 106-1 through 106-X). As further shown, each multiplexing/demultiplexing stage 104 includes a pair of WSSs 108 (e.g., WSS 108-1A and WSS 108-1B through WSS 108-XA and WSS 108-XB). As shown, a first WSS 108 of each pair (e.g., WSS 108-1A, WSS 108-XA) is coupled to an input fiber (e.g., 150-1, 150-X) associated with a respective degree 102, while a second WSS of each pair (e.g., WSS 108-1B, WSS 108-XB) is coupled to an output fiber (e.g., 155-1, 155-X) associated with the respective degree 102.

As further shown, optical node 100 includes add/drop stage 120. As shown, add/drop stage 120 includes a set of MC-WSSs 122 (e.g., MC-WSS 122-1 and MC-WSS 122-2). MC-WSS 122 is a hybrid add/drop device that supports CDC add/drop of optical signals at optical node 100. In some implementations, MC-WSS 122 includes elements of both a M×N WSS and a MCS, which results in MC-WSS 122 having improved scalability (e.g., as compared to a M×N WSS or a MCS alone). Additional details of MC-WSS 122 are described below with regard to FIGS. 2A-2C.

As shown in FIG. 1, a first MC-WSS 122 (e.g., MC-WSS 122-1), associated with dropping optical signals at optical node 100, may be coupled to a set of optical receivers (RX) 124. While not shown, in some cases, the first MC-WSS 122 may be coupled to a set of splitters, where the set of splitters is coupled to the set of optical receivers (RX) 124. Similarly, a second MC-WSS 122 (e.g., MC-WSS 122-2), associated with adding optical signals at optical node 100, may be coupled to a set of optical transmitters (TX) 126.

A degree 102 bi-directionally connects optical node 100 to another optical node or an endpoint node of, for example, a DWDM optical communications system. For example, WSS 108-1A may receive an input signal from another optical node via an optical fiber. Here, if a portion of the input signal (e.g., one or more wavelength channels) is to be dropped, then WSS 108-1A may selectively provide the portion of the input signal (e.g., an optical signal including the one or more wavelength channels, sometimes referred to as a wavelength channel sub-beam) on a drop path to one or more optical receivers 124 (e.g., a path from WSS 108-1A, via MC-WSS 122-1, to one or more optical receivers 124). Further, if a portion of the input signal is to continue on an outbound optical fiber of another degree 102 (i.e., is not to be dropped), then WSS 108-1A may selectively provide the portion of the input signal on an express path to an outbound WSS 108 associated with the other degree 102 (e.g., a path from WSS 108-1A to WSS 108-XB).

As another example, WSS 108-1B may provide an output signal to another optical node via an optical fiber. Here, WSS 108-1B may receive an optical signal, added at optical node 100, on an add path from optical transmitter 126 (e.g., a path from optical transmitter 126, via MC-WSS 122-2, to WSS 108-1B), and provide an output signal, including the optical signal, via the optical fiber. Similarly, WSS 108-1B may receive a portion of an input signal on an express path from an inbound WSS 108 (e.g., WSS 108-XA) associated with another degree 102, and may provide an output signal, including the portion of the input signal, via the optical fiber.

In optical node 100, any wavelength may be switched to any fiber direction (i.e., any degree), and multiple channels of the same wavelength can be concurrently routed between a transmitter/receiver of optical node 100 and a target outbound/inbound optical fiber of optical node 100. In other words, optical node 100 is capable of achieving CDC add/drop.

The number and arrangement of devices shown and described in association with FIG. 1 are provided as examples. In practice, optical node 100 may include additional devices, fewer devices, different devices, differently arranged devices, and/or differently sized devices than those shown in FIG. 1.

Figure 2A:
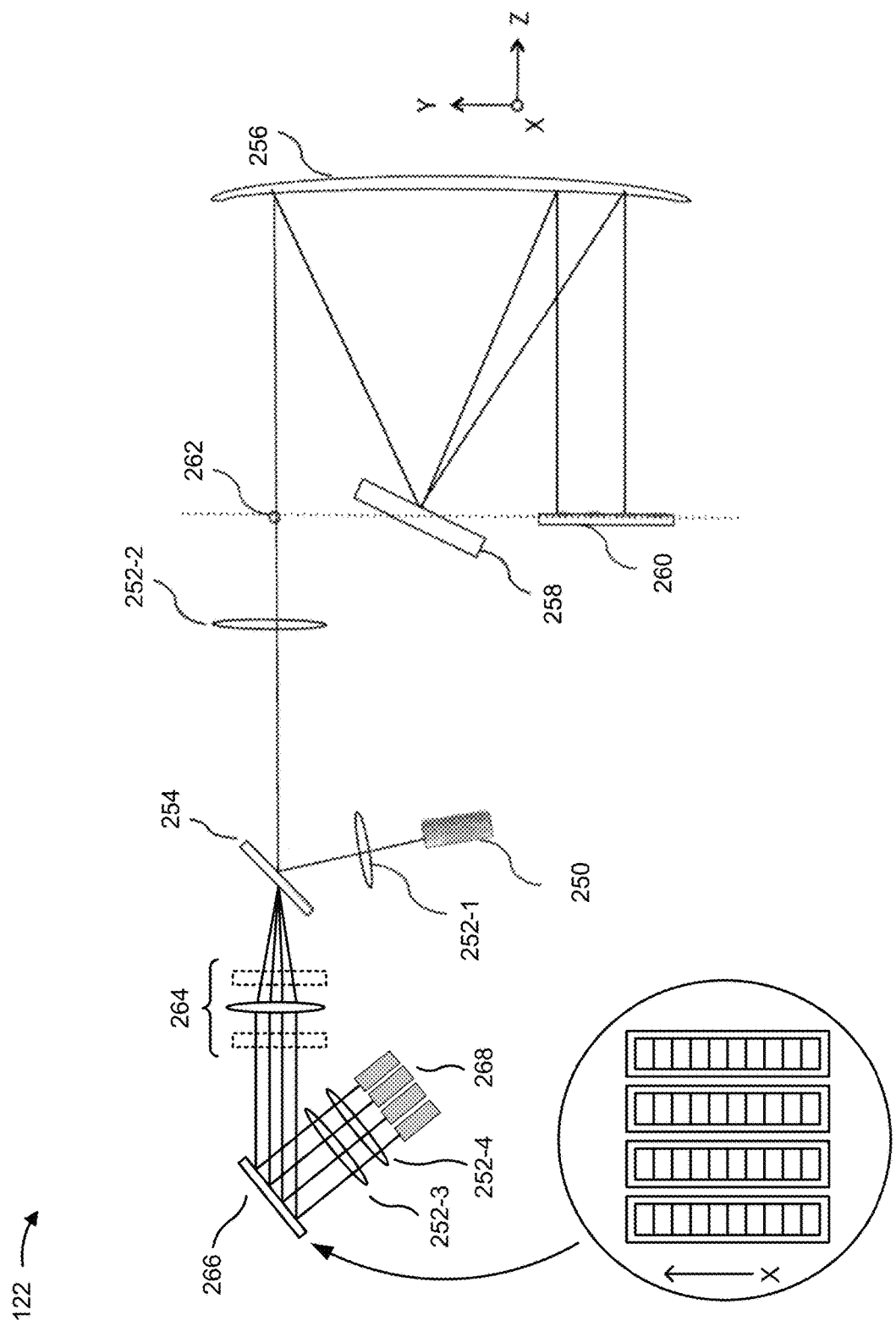
FIGS. 2A-2C are diagrams of an example implementation of a MC-WSS of the optical node of FIG. 1.
Figure 2B:
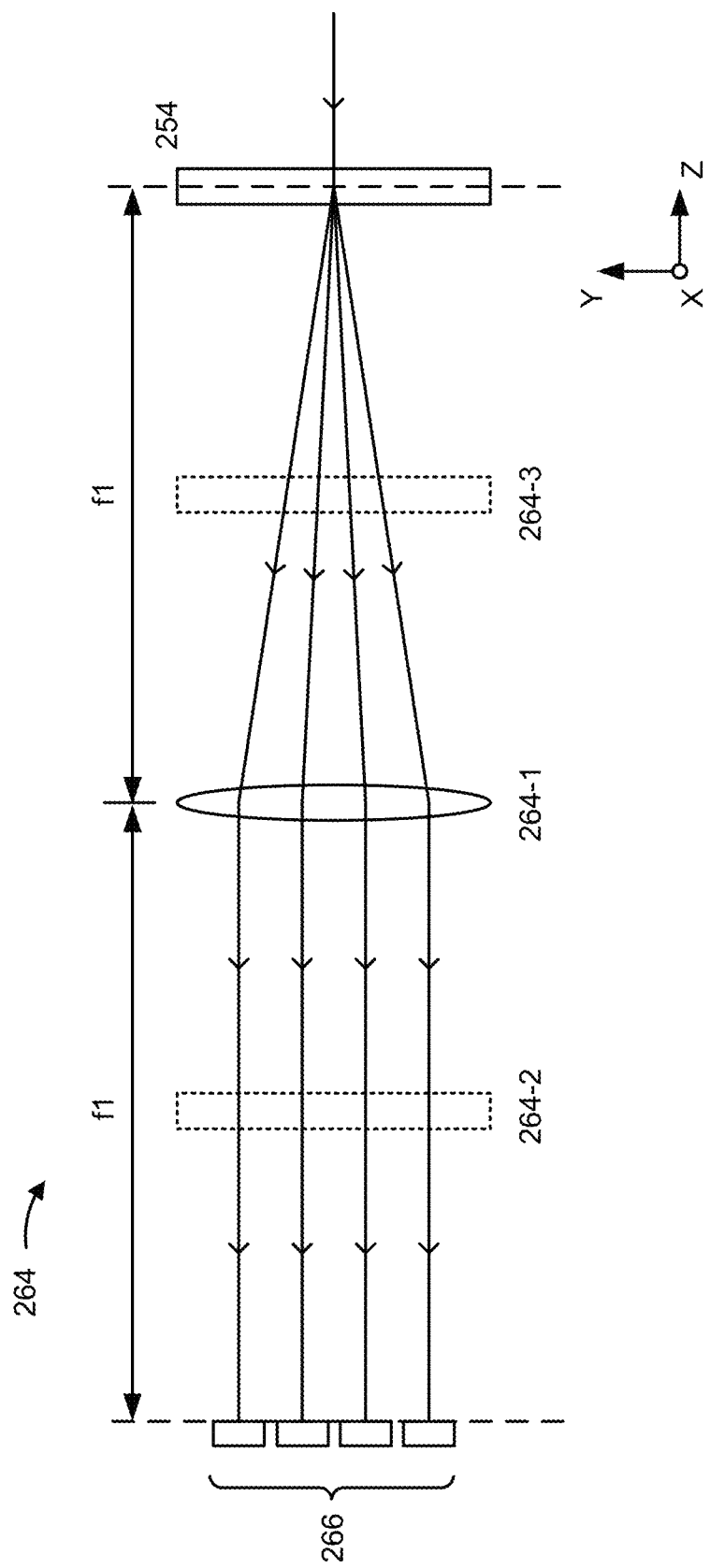
Figure 2C:
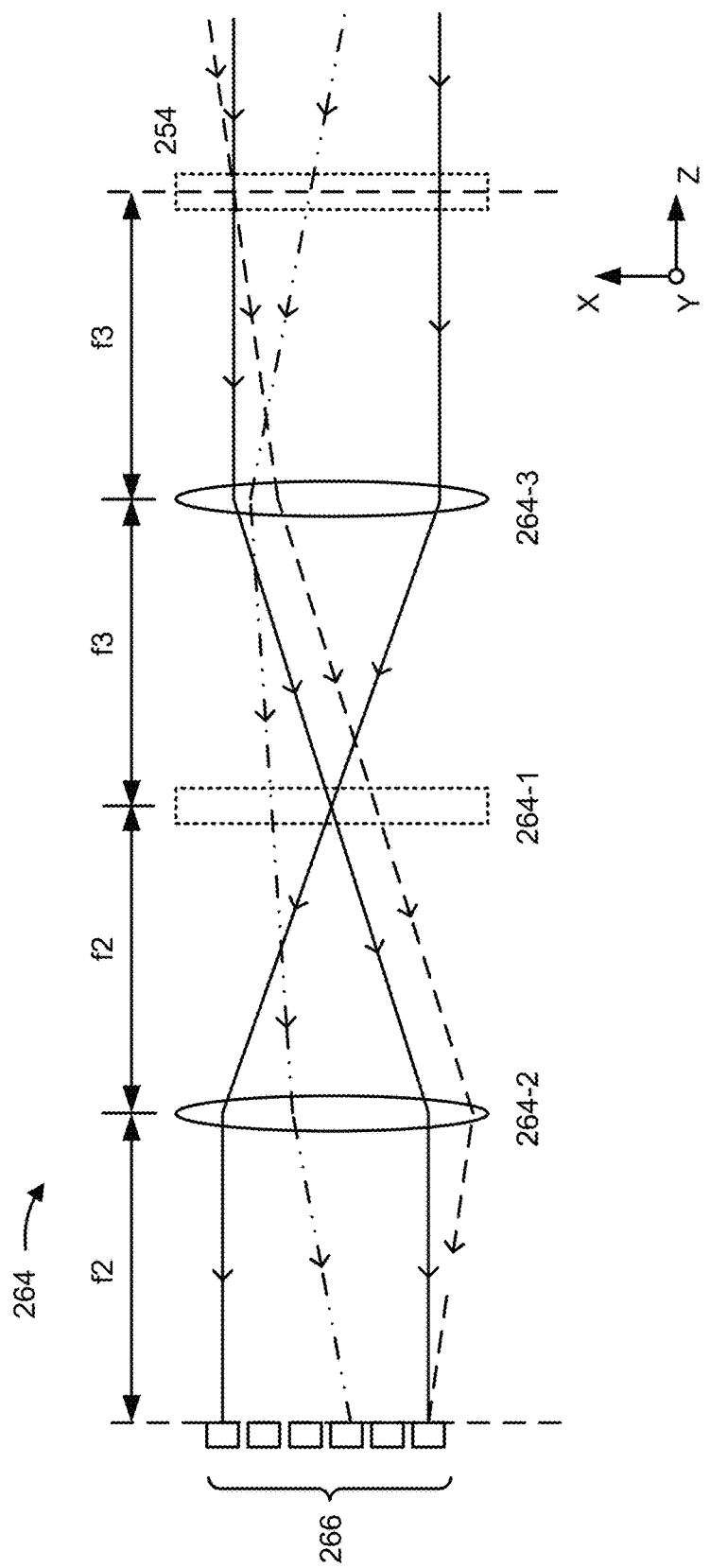

FIGS. 2A-2C are diagrams of an example implementation of MC-WSS 122 of optical node 100. FIG. 2A is a first view (e.g., corresponding to a y-z plane) of an example arrangement of elements of MC-WSS 122, with improved scalability, that supports CDC add/drop at optical node 100. FIGS. 2B and 2C are diagrams detailing imaging optics included in MC-WSS 122.

As shown in FIG. 2A, MC-WSS 122 may include a first port array 250, a group of lenses 252 (lens 252-1 through lens 252-4), a splitter/combiner 254, a mirror 256, a dispersive element 258, a first switching array 260, imaging optics 264, a second switching array 266, and a second port array 268. Elements of MC-WSS 122 are described below, followed by a description of an example operation of MC-WSS 122.

Notably, while MC-WSS 122 is described below in the context of MC-WSS 122 operating with M ports functioning as input ports to receive optical signals and K×N ports functioning as output ports to drop optical signals, in some implementations, MC-WSS 122 may operate such that the K×N ports function as input ports to add optical signals and the M ports function as output ports to transmit optical signals, depending upon a direction of propagation of an optical signal.

First port array 250 includes a plurality of M (M>1) ports for launching beams of light (e.g., optical signals including one or more wavelength channels) into a switch core of MC-WSS 122 or receiving light launched by second port array 268. Similarly, second port array 268 includes a plurality of K×N (K>1, N>1) ports for receiving light launched by ports of first port array 250 or launching beams of light into the switch core of MC-WSS 122. In some implementations, ports of first port array 250 and ports of second port array 268 are optically coupled to optical fibers or waveguides. For example, first port array 250 may be optically coupled to an input fiber array and second port array 268 may be optically coupled to an output fiber array.

Optionally, each input optical fiber/waveguide and each output optical fiber/waveguide may be optically coupled to a collimating/focusing lens centered on the optical axis thereof. For example, first port array 250 and second port array 268 may be optically coupled to an input fiber array and an output fiber array, respectively, that terminate in respective microlens arrays. In some implementations, an end of each input optical fiber/waveguide and an end of each output optical fiber/waveguide may be provided with an expanded core. In some implementations, the input fiber array may be coupled to a planar waveguide concentrator in which a waveguide spacing matches a fiber spacing on a first end coupled to the input fiber array, and the waveguide spacing is smaller than the fiber spacing on a second end. Providing each optical fiber/waveguide with a collimating/focusing lens, an expanded core, or a waveguide concentrator allows a number of input ports and/or output ports of MC-WSS 122 to be increased.

In the example MC-WSS 122 of FIG. 2A, the M ports of first port array 250 are aligned in a vertical direction (i.e., in a direction along an x-axis) such that the M ports are arranged in a one-dimensional array (i.e., a single column). In MC-WSS 122, the K×N ports of second port array 268 are arranged in a two-dimensional array. For example, second port array 268 may include K sets of N ports, where the N ports of each of the K sets are aligned in the vertical direction, and where the K sets are adjacent to one another along a direction that is substantially parallel to a y-z plane. As a particular example, as shown in FIG. 2A, second port array 268 may include four subsets of output ports (K=4) and each subset of output ports may include 10 ports (N=10). Here, second port array 268 includes 40 total ports (e.g., K×N=40), and second port array 268 is in a 4×10 arrangement. In this example, the four subsets of ports are aligned along a direction that is substantially parallel to the y-z plane, and the 10 ports of each of the four subsets are aligned in the vertical direction. In some implementations, the number of M ports and/or the number of K×N ports of MC-WSS 122 may be in a range from, for example, 4 to 100 (e.g., MC-WSS 122 may be a 16×64 MC-WSS).

Lenses 252-1 through 252-4 include lenses for collimating or focusing beams of light within MC-WSS 122. For example, lenses 252-1 through 252-4 may be spherical lenses. In some implementations, lens 252-1 and lens 252-2 may have different focal lengths in order to form a beam expander or reducer that increases or decreases separation, in the vertical direction, respectively, among beams within MC-WSS 122. For example, lenses 251-1 and 252-2 may form a beam expander that increases separation among beams launched by first port array 250 (e.g., in order to match a separation, in the vertical direction, between rows of switching elements of first switching array 260). Alternatively, lens 252-1 and lens 252-2 may have the same focal length.

As shown in FIG. 2A, in a forward direction of propagation (e.g., from splitter/combiner 254 toward first switching array 260), lens 252-2 may be arranged such that a beam of light (e.g., an input beam launched by first port array 250 when MC-WSS 122 operates to drop an optical signal at optical node 100, or a combined wavelength channel sub-beam formed at splitter/combiner 254 when MC-WSS 122 operates to add an optical signal at optical node 100) is focused by lens 252-2 at spot 262 on a focal plane of mirror 256. The focal plane of mirror 256 is represented by the dashed line passing through spot 262 in FIG. 2A.

For example, in a reverse direction of propagation (e.g., from first switching array toward splitter/combiner 254), when MC-WSS 122 operates to drop an optical signal at optical node 100, lens 252-2 may operate as an angle-to-offset converter for converting vertical angles of wavelength channel sub-beams (e.g., vertical angles introduced by first switching array 260) to vertical offsets at splitter/combiner 254, and to convert vertical offsets of the wavelength channel sub-beams (e.g., corresponding to vertical positions of the ports of first port array 250) to vertical angles at splitter/combiner 254.

In some implementations, lens 252-3 and lens 252-4 may have different focal lengths in order to form a beam reducer or separator that decreases or increases separation among wavelength channel sub-beams in a vertical direction. For example, lenses 251-3 and 252-4 may form a beam reducer in order to match a separation among second port array 268 when MC-WSS 122 operates to drop optical signals. Alternatively, lens 252-3 and lens 252-4 may have the same focal length. As shown in FIG. 2A, lenses 252-3 and 252-4 may be disposed between second switching array 266 and second port array 268.

Mirror 256 includes an element for reflecting and/or directing beams among elements of MC-WSS 122. For example, as shown in FIG. 2A, mirror 256 may include a concave mirror. In some implementations, dispersive element 258 and/or first switching array 260 may be disposed at a focal plane of mirror 256 (e.g., such that light, reflected by mirror 256, is either focused or collimated at dispersive element 258 and first switching array 260). As shown in FIG. 2A, in the forward direction of propagation, mirror 256 may be arranged to reflect a beam of light to dispersive element 258, and to reflect dispersed wavelength channel sub-beams, after dispersion by dispersive element 258, to first switching array 260. In the reverse direction of propagation, mirror 256 may be arranged to reflect the dispersed wavelength channel sub-beams, after vertical steering by first switching array 260, to dispersive element 258, and to reflect beams of light, formed by dispersive element 258 from groups of dispersed wavelength channel sub-beams, to splitter/combiner 254 (via lens 252-2).

Dispersive element 258 includes an element to separate a beam of light into dispersed wavelength channel sub-beams, and combine (e.g., converge) groups of dispersed wavelength channel sub-beams, based on wavelength. For example, dispersive element 258 may include a diffraction grating, a prism, an Echelle grating, a grism, and/or the like. In some implementations, as shown in FIG. 2A, dispersive element 258 may be disposed at the focal plane of mirror 256.

In the forward direction of propagation, dispersive element 258 is capable of separating (e.g. spreading or angular divergence) a beam of light (e.g., an input beam launched by first port array 250, a combined wavelength channel sub-beam formed from input beams launched by second port array 268) into L (L>1) sub-beams, each carrying a wavelength channel of the beam that includes one or more wavelengths in a particular range of wavelengths (herein referred to as dispersed wavelength channel sub-beams). L is a total number of wavelength channels supported by optical node 100. As shown in FIG. 2A, in some implementations, dispersive element 258 is oriented such that the L dispersed wavelength channel sub-beams are separated (i.e., spread or angular divergence) in a plane parallel to the y-z plane (e.g., such that each dispersed wavelength channel sub-beam is reflected by dispersive element 258 at a different angle in a lateral direction). As further shown, the L dispersed wavelength channel sub-beams are coupled to first switching array 260 by mirror 256 (e.g., such that each of the L dispersed wavelength channel sub-beams is incident on a different switching element of first switching array 260).

In the reverse direction of propagation, dispersive element 258 is capable of combining (e.g. angular converging) groups of dispersed wavelength channel sub-beams in the lateral direction to form wavelength channel sub-beams (e.g., each including one or more dispersed wavelength channel sub-beams). In some implementations, dispersive element 258 is oriented to combine the groups of dispersed wavelength channel sub-beams in the lateral direction, while maintaining respective vertical angles (applied by first switching array 260) of the dispersed wavelength channel sub-beams.

First switching array 260 includes an array of switching elements for independent routing of dispersed wavelength channel sub-beams. For example, first switching array 260 may include a LCoS switching array, a two-dimensional array of tiltable MEMS mirrors, and/or the like. In some implementations, first switching array 260 includes M rows of L switching elements. In FIG. 2A, one row of L switching elements is shown (i.e., the M rows are stacked in the vertical direction in FIG. 2A).

In some implementations, first switching array 260 is disposed such that each switching element of a given row, of the M rows, may be illuminated by one of the L dispersed wavelength channel sub-beams. In other words, each dispersed wavelength channel sub-beam, of the M sets of L dispersed wavelength channel sub-beams, may be incident on a different switching element of first switching array 260. In some implementations, each switching element of first switching array 260 may steer a respective dispersed wavelength channel sub-beam in a vertical direction (e.g., such that the dispersed wavelength channel sub-beam is reflected at an angle with respect to the y-z plane). In some implementations, the vertical angle applied to a given dispersed wavelength channel sub-beam is determined based on a control signal applied to the corresponding switching element (e.g., a signal that changes a phase of a tunable liquid crystal phase delay switching element of an LCoS switching element, a signal that tilts a MEMS mirror of a MEMS array about a steering axis that is parallel to the y-axis, and/or the like). In some implementations, first switching array 260 may be disposed at the focal plane of mirror 256.

Splitter/combiner 254 (sometimes referred to as a splitting element or a combining element) includes an element for splitting (e.g., spreading, angularly diverging) or combining (e.g., angularly converging) beams within MC-WSS 122. For example, when MC-WSS 122 operates to drop optical signals at optical node 100, splitter/combiner 254 splits a wavelength channel sub-beam (e.g., a wavelength channel sub-beam formed by dispersive element 258) into K portions (herein referred to as K split wavelength channel sub-beams), and sends the K split wavelength channel sub-beams to second switching array 266 (e.g., via imaging optics 264). Here, splitter/combiner 254 may include a diffractive beam splitter that splits the wavelength channel sub-beam independent of wavelength and, thus, splits the wavelength channel sub-beam such that each of the K split wavelength channel sub-beams includes some of each wavelength channel included in the wavelength channel sub-beam. As shown in FIG. 2A, in some implementations, splitter/combiner 254 may split the wavelength channel sub-beam such that the K split wavelength channel sub-beams are separated in the lateral direction. As shown in FIG. 2A, in some implementations, splitter/combiner 254 may be disposed such that the wavelength channel sub-beams, formed by dispersive element 258, are reflected to splitter/combiner 254 by mirror 256 (via leans 252-2). In some implementations, splitter/combiner 254 may include a reflective portion (e.g., a mirror portion) for reflecting (without splitting) input beams launched by first port array 250. Thus, as shown in FIG. 2A, splitter/combiner 254 may reflect input beams, launched by first port array 250, to mirror 256 (via lens 252-2).

Alternatively, when MC-WSS 122 operates to add optical signals at optical node 100, splitter/combiner 254 combines (e.g., converges) up to K wavelength channel sub-beams (e.g., launched by up to K respective ports of second port array 268 and directed by K corresponding switching elements of second switching array 266)) to form a combined wavelength channel sub-beam, and sends the wavelength channel sub-beam toward mirror 256 (e.g., via lens 252-2). Here, splitter/combiner 254 operates as a beam combiner that combines (e.g., converges) the up to K wavelength channel sub-beams to form one of up to N combined wavelength channel sub-beams. As shown in FIG. 2A, in some implementations, splitter/combiner 254 may combine (e.g., converge) the K wavelength channel sub-beams in the lateral direction. In some implementations, splitter/combiner 254 may be disposed such that the combined wavelength channel sub-beam, formed by splitter/combiner 254, is reflected to dispersive element 258 by mirror 256.

When MC-WSS 122 operates to drop optical signals at optical node 100, imaging optics 264 includes a set of elements to convert a lateral angle of a split wavelength channel-sub beam (e.g., introduced by splitter/combiner 254) to a lateral offset at second switching array 266, and to replicate an image of the split wavelength channel sub-beams at splitter/combiner 254 on second switching array 266. When MC-WSS 122 operates to add optical signals at optical node 100, imaging optics 264 includes a set of elements to convert a lateral offset of one of the K wavelength channel-sub beams (e.g., launched by K ports of second port array 268) to a lateral angle at splitter/combiner 254, and to replicate an image of the wavelength channel sub-beam at second switching array 266 on splitter/combiner 254. FIGS. 2B and 2C are diagrams associated with an example arrangement of imaging optics 264 in MC-WSS 122.

A view corresponding to the y-z plane is shown in FIG. 2B. As shown, imaging optics 264 may include a lens 264-1, such as a cylindrical lens, with a focal length f1. As shown in FIG. 2B, lens 264-1 may be disposed at the focal length f1 from splitter/combiner 254 and at the focal length f1 from second switching array 266. As shown in FIG. 2B, when MC-WSS 122 operates to drop optical signals at optical node 100, lens 264-1 converts lateral angles, introduced to K split wavelength channel-sub beams (e.g., four are shown in FIG. 2B) at splitter/combiner 254, to lateral offsets at second switching array 266. Conversely, when MC-WSS 122 operates to add optical signals at optical node 100, lens 264-1 converts lateral offsets of K wavelength channel-sub beams at second switching array 266, to lateral angles at splitter/combiner 254. Notably, imaging optics 264 may further include lenses 264-2 and 264-3. However, lenses 264-2 and 264-3 do not affect the beams in the lateral direction (e.g., as indicated by the dotted outlines in FIG. 2B)

A view corresponding to the x-z plane is shown in FIG. 2C. As shown, lenses 264-2 and 264-3 (e.g., a pair of cylindrical lenses) may have focal lengths f2 and f3, respectively. As shown in FIG. 2C, lens 264-2 may be disposed at the focal length f2 from second switching array 266, while lens 264-3 may be disposed at the focal length f3 from splitter/combiner 254. As further shown, lens 264-2 may be separated from lens 264-3 by a distance equal to a sum of the focal length f2 and the focal length f3. In some implementations, the focal length f2 may be the same as the focal length f3. Alternatively, the focal length f2 may be different from the focal length f3. In some implementations, the focal length f2 and/or the focal length f3 may be approximately equal to one half of the focal length f1.

When MC-WSS 122 operates to drop optical signals at optical node 100, as shown in FIG. 2C, lens 264-2 and lens 264-3 may replicate an image of a split wavelength channel sub-beam, at splitter/combiner 254, on second switching array 266. In FIG. 2C, each arrow entering from the right side represents a wavelength channel sub-beam. A vertical position (e.g., along an x-direction in FIG. 2C) of each wavelength channel sub-beam corresponds to a row of switching elements to which a respective split wavelength channel sub-beam, sent by splitter/combiner 254 after splitting the wavelength channel sub-beam, are to be provided. A vertical angle (e.g., with respect to the y-z plane) of each wavelength channel sub-beam corresponds to a port from which a respective wavelength channel sub-beam originated. In FIG. 2C, splitter/combiner 254 separates a given wavelength channel sub-beam into K split wavelength channel sub-beams in the lateral direction (e.g., into/out of the page of FIG. 2C). Thus, FIG. 2C shows a group of split wavelength channel sub-beams to be provided to one column of N switching elements of second switching array 266. In operation, matching groups (e.g., when K=4, three additional groups) of split wavelength channel sub-beams are provided to other columns of N switching elements.

As shown in FIG. 2C, lenses 264-2 and 264-3 maintain the vertical offsets and vertical angles of each split wavelength channel sub-beam from splitter/combiner 254 to second switching array 266, thereby replicating the vertical image, at splitter/combiner 254, on second switching array 266. In some implementations, as shown in FIG. 2C, the image at second switching array 266 may be inverted as compared to the image at splitter/combiner 254. Here, by conserving the vertical angles, switching elements of second switching array 266 are independently able to select which angle (and therefore, which port of first port array 250) is routed to each output port in second port array 268, thereby maintaining contentionless (i.e., full non-blocking) switching. Lenses 264-2 and 264-3 may replicate an image in a similar manner when MC-WSS 122 operates to add optical signals at optical node 100 (e.g., lens 264-2 and lens 264-3 may replicate an image of K wavelength channel sub-beams, at second switching array 266, on splitter/combiner 254).

Returning to FIG. 2A, second switching array 266 includes K×N switching elements to reflect beams of light. For example, when MC-WSS 122 operates to drop optical signals at optical node 100, second switching array 266 may reflect split wavelength channel sub-beams, propagated by splitter/combiner 254, to second port array 268. Conversely, when MC-WSS 122 operates to add optical signals at optical node 100, second switching array 266 may reflect wavelength channel sub-beams, launched by second port array 268, to splitter/combiner 254. In addition, second switch array 266 may introduce vertical angles which are relayed by lens 264-2 and lens 264-3 onto splitter/combiner 254 and subsequently converted by lens 252-2 into vertical offsets and imaged by mirror 256 onto first switching array 260. Here, vertical offsets at switching array 260 correspond to vertical positions of the ports in first port array 250.

In second switching array 266, each switching element is associated with one of the K×N output ports of second port array 268. In some implementations, second switching array 266 may include a K×N array of tiltable MEMS mirrors, where each MEMS mirror is associated with one of the K×N ports of second port array 268. In some implementations, second switching array 266 may be a single array (e.g., including each of the K×N switching elements). Alternatively, second switching array 266 may be multiple arrays (e.g., each including one of the K sets of N switching elements) that are separated in space.

When MC-WSS 122 operates to drop optical signals at optical node 100, second switching array 266 couples a split wavelength channel sub-beam (e.g., one of the K split wavelength channel-sub-beams associated with a given one of the N wavelength channel sub-beams), incident on a switching element of second switching array 266, to a corresponding output port of second port array 268. Which split wavelength channel sub-beam is coupled depends on a vertical angle applied by first switching array 260, as described above.

In some implementations, one or more switching elements of second switching array 266 may include tunable filters for filtering wavelength channels from one or more corresponding split wavelength channel sub-beam incident thereon. For example, a grating may be etched on a surface of the switching element (e.g., on a surface of a MEMS mirror). In this case, the switching element operates as a wavelength selective mirror, where different wavelength channels are steered at different angles. When second switching array 266 is a MEMS array, one possible configuration is to use a two-axis tilt for each MEMS mirror, where a tilt about a first axis (e.g., an axis perpendicular to the vertical direction) is used to select a port of first port array 250 and a tilt about a second axis (e.g., an axis along the vertical direction) is used to select a wavelength to be routed to a corresponding port of second port array 268 (with other wavelengths being steered away from the output port).

In an example operation of MC-WSS 122 being used to drop optical signals at optical node 100, a port of first port array 250 launches an input beam (e.g., including L wavelength channels) toward a mirror portion of splitter/combiner 254 (via lens 252-1). The mirror portion of splitter/combiner 254 reflects the input beam to mirror 256 (via lens 252-2), which reflects the input beam to dispersive element 258.

Dispersive element 258 separates (e.g., angularly diverges) the input beam into L dispersed channel wavelength sub-beams in the lateral direction, and sends the L dispersed wavelength channel sub-beams to mirror 256. Mirror 256 reflects each of the L dispersed wavelength channel sub-beams to a respective switching element in one of M rows of switching elements of first switching array 260.

At first switching array 260, each switching element steers a respective dispersed wavelength channel sub-beam in a respective vertical direction (e.g., by tilting to apply vertical angle to the dispersed wavelength channel sub-beam) back to mirror 256. Here, a vertical angle applied at first switching array 260 corresponds to a row in which an output port, to which a given dispersed wavelength channel sub-beam is to be provided, is located. Mirror 256 reflects the vertically angled L dispersed wavelength channel sub-beams to dispersive element 258.

Dispersive element 258 combines (e.g., angularly converges) dispersed wavelength channel sub-beams in the lateral direction to form wavelength channel sub-beams (e.g., X (X≥1) wavelength channel sub-beams), while maintaining respective angles or offsets in the vertical direction, and sends the wavelength channel sub-beams to mirror 256. Mirror 256 reflects the wavelength channel sub-beams to splitter/combiner 254 via lens 252-2. Lens 252-2 converts the vertical angles of the wavelength channel sub-beams (e.g., corresponding to the row of the target output port) to vertical offsets at splitter/combiner 254, and converts vertical offsets of the wavelength channel sub-beams (e.g., corresponding to vertical positions of the ports of first port array 250) to vertical angles at splitter/combiner 254.

Splitter/combiner 254 splits (e.g. angularly diverges) each of the wavelength channel sub-beams into K split wavelength channel sub-beams, while maintaining respective angles or offsets in the vertical direction. Lens 264-1 converts the lateral angles, introduced to the K split wavelength channel sub-beams at splitter/combiner 254, to lateral offsets at second switching array 266. Lenses 264-2 and 264-3 replicate the image of each split wavelength channel sub-beam in the vertical direction (e.g., preserving vertical angles and vertical offsets), at splitter/combiner 254, on second switching array 266. The K split wavelength channel sub-beams illuminate corresponding switching elements of second switching array 266.

A switching element of second switching array 266 selects (e.g., by tilting) a port of first port array 250 to be coupled to a port of second port array 268 associated with the switching element, and reflects a split wavelength channel sub-beam, incident on the switching element, to the port of second port array 268. In this way, any wavelength channel launched by a given port of first port array 250 is independently switchable to any one of the K×N ports of second port array 268. As described above, such switching controlled using tilt angles of corresponding switching elements of first switching array 260 and second switching array 266. As noted above, the example operation of MC-WSS 122 is provided for illustrative purposes, and other examples are possible.

The number and arrangement of elements shown and described in association with FIGS. 2A-2C are provided as examples. In practice, MC-WSS 122 may include additional elements, fewer elements, different elements, differently arranged elements, and/or differently sized elements than those shown in FIGS. 2A-2C. For example, in some implementations, elements of MC-WSS 122 may be arranged such that MC-WSS 122 includes two separate dispersive elements (e.g., a first dispersive element to separate beams of light into dispersed wavelength channel sub-beams, and a second dispersive element to combine groups of dispersed wavelength channel sub-beams to form wavelength channel sub-beams). As another example, in some implementations, a first MC-WSS 122 and a second MC-WSS 122 may be arranged in a co-packaged (e.g., twin) configuration in which first M inputs and second M inputs (associated with the first MC-WSS 122 and the second MC-WSS 122, respectively), and first K×N outputs and second K×N outputs (associated with the first MC-WSS 122 and the second MC-WSS 122, respectively), share a common optical freespace, imaging optics 264, dispersive element 258, mirror 256, and/or the like. In a co-packaged configuration, the first MC-WSS 122 and the second MC-WSS 122 may have respective first switching arrays on the same chip or die, or respective second switching arrays on the same chip or die. Further, references to vertical directions, lateral directions, particular planes, and x, y, z directions are merely examples provided to give context associated with the description of MC-WSS 122.

For example, in an application where one or more low insertion loss output ports are needed, MC-WSS 122 may be configured such that a subset of wavelength channel sub-beams pass through or bypass splitting at splitter/combiner 254 (i.e., without incurring the multicasting function), thereby providing a set of output ports with lower insertion loss (e.g., as compared to output ports at which split wavelength channel sub-beams are received). In some implementations, the pass-through or bypass feature may be implemented by selectively patterning splitter/combiner 254 with a clear region that allows the subset of beams to pass through without effect.

In some implementations, MC-WSS 122 may support super-channel aggregation of input beams. For example, when MC-WSS 122 operates to add optical signals, super-channel aggregation may be achieved between a set of the K×N ports (e.g., operating as input ports) that share a same combiner at splitter/combiner 254 (e.g., since splitter/combiner 254 becomes a combiner when MC-WSS 122 operates as an add device). Here, no additional insertion loss is incurred. Alternatively, MC-WSS 122 may be capable of performing super-channel aggregation between arbitrary inputs (e.g., using first switching array 260), but may incur additional insertion loss (e.g., 4 decibels) similar to that incurred by an equivalent M×N WSS when performing super channeling.

Figure 3:
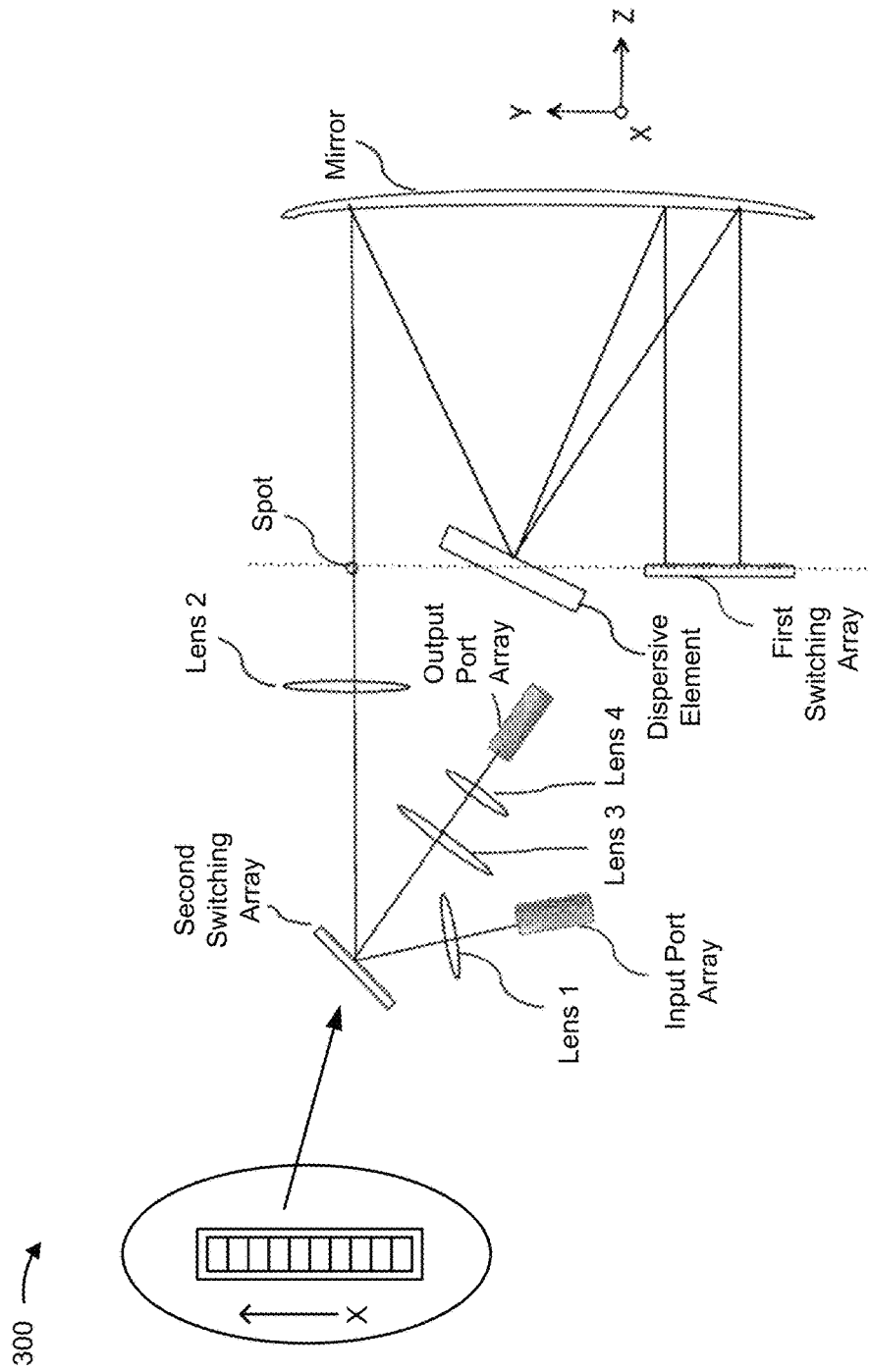
FIG. 3 is a diagram of a prior art M×N WSS.

Notably, MC-WSS 122 includes elements of both an M×N WSS and a MCS. For example, MC-WSS 122 provides wavelength selective functionality of a typical M×N WSS, while also including passive splitting functionality of a typical MCS. FIG. 3 is a diagram of a prior art M×N WSS 300 provided for comparison to MC-WSS 122. As shown in FIG. 3, prior art M×N WSS 300 includes an first port array, a group of lenses (lens 1 through lens 4), a mirror, a dispersive element, a first switching array, a second switching array, and an second port array. Of note, prior art M×N WSS does not include splitter/combiner 254 or imaging optics 264. In other words, prior art M×N WSS 300 does not include the passive splitting/combining functionality that is provided in MC-WSS 122 (e.g., wavelength channel sub-beams are not split to form split wavelength channel sub-beams, as described above with regard to MC-WSS 122). Furthermore, the second port array includes a one-dimensional array of N output ports (rather than a two-dimensional array of K×N output ports), and the second switching array is a one-dimensional switching array including N switching elements (rather than a two-dimensional switching array including K×N switching elements).

In some cases, due to the hybrid nature of the MC-WSS 122 design (e.g., since MC-WSS 122 passively splits wavelength channel sub-beams), insertion loss could be such that it would be beneficial to include optical amplifiers in a given MC-WSS 122. However, as M and/or N scale in order to satisfy a demand for increased network capacity, the given MC-WSS 122 will have a lower cost and complexity than that of an equivalent M×N WSS (e.g., since such optical amplifiers will be relatively low-cost and small in size). Furthermore, as M and/or N scale in order to satisfy a demand for increased network capacity, insertion loss of the given MC-WSS 122 will be lower than that of an equivalent MCS (e.g., since the passive splitting in MC-WSS 122 is less severe than needed in the equivalent MCS).

Figure 4A:
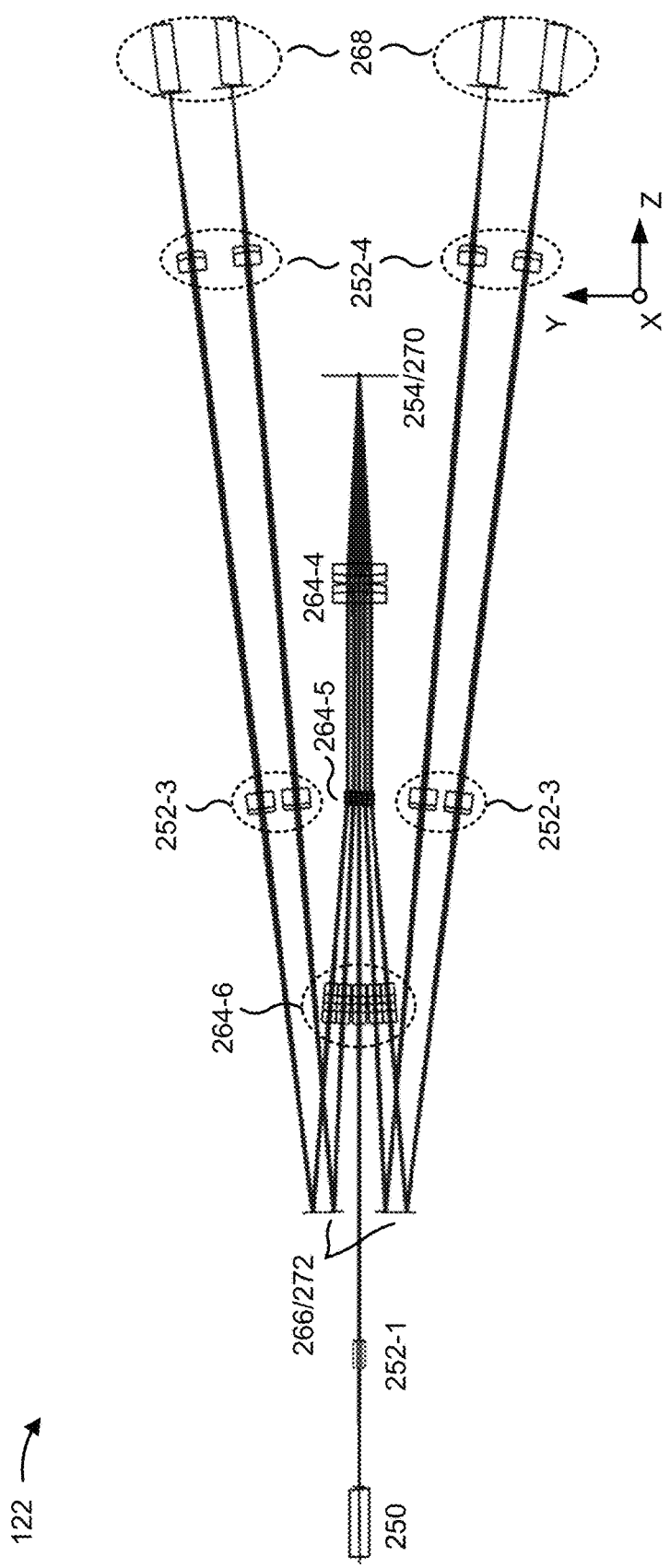
FIGS. 4A-4C are diagrams of another example implementation of a MC-WSS of the optical node of FIG. 1.
Figure 4B:
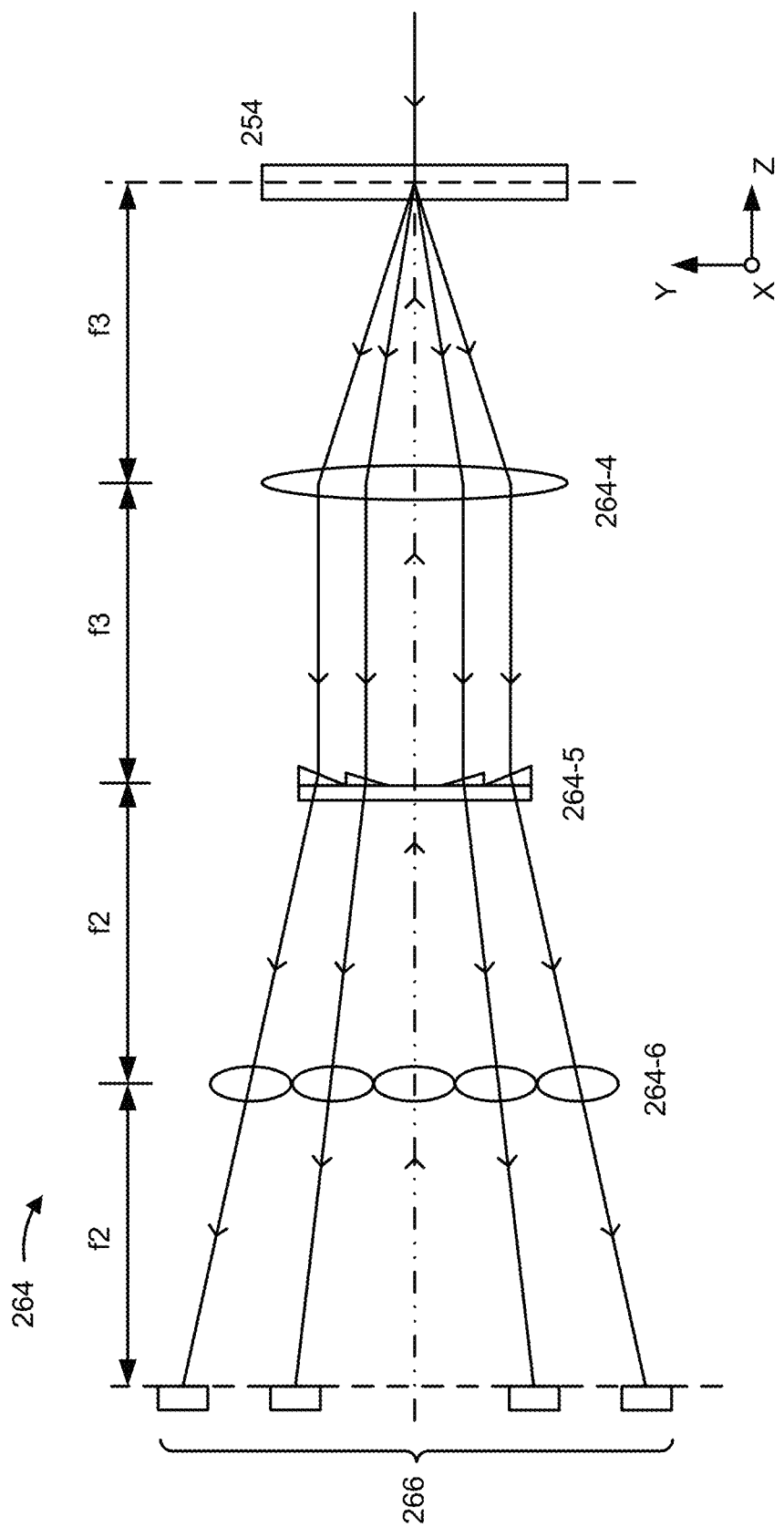
Figure 4C:
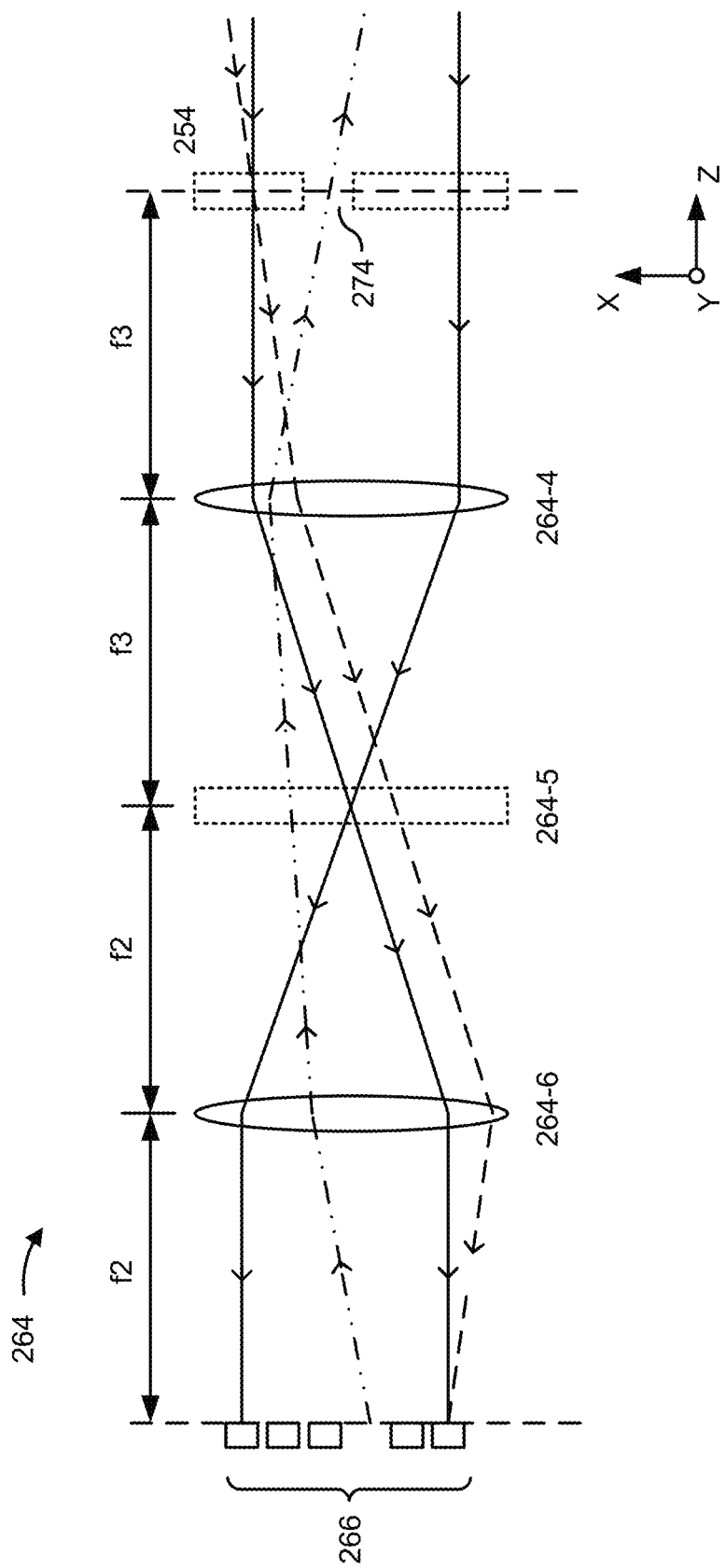

FIGS. 4A-4C are diagrams of another example implementation of MC-WSS 122 of optical node 100. FIG. 4A is a diagram of an example optical design of MC-WSS 122 from first port array 250 to splitter/combiner 254 and from splitter/combiner 254 to second port array 268 (i.e., optical paths between splitter/combiner 254 and first switching array 260 are not shown and may be similar to that described above in respect of FIGS. 2A-C).

As shown in FIG. 4A, the optical design of FIG. 4A allows for a wider separation between columns of second switching array 266 (e.g., as compared to the optical design of FIG. 2A). This may be useful when, for example, second switching array 266 comprises an array of MEMS mirrors. In such a case, the wider separation afforded by the optical design of FIG. 4A may provide spacing sufficient to accommodate actuator structures beside each column of MEMS mirrors of second switching array 266.

As shown in FIG. 4B, in some implementations, such separation may be achieved by using lens 264-4 to, for example, collimate the split wavelength channel sub-beams at a multi-faceted prism 264-5 that further separates the split wavelength channel sub-beams (e.g., in addition to the separation provided by splitter/combiner 254). As further shown, MC-WSS 122 may include a set of lenses 264-6 (e.g., each corresponding to a respective split wavelength channel sub-beam) that focus the split wavelength channel sub-beams on the respective switching elements of switching array 266. Further, while not shown, in some implementations, light reflected by each switching element of switching array 266 may couple to a respective fiber collimator array. In some implementations, this solution is preferable to increasing a diffraction angle of splitter/combiner 254, as doing so would result in increased loss and wavelength dependence for splitter/combiner 254.

FIGS. 4B and 4C are diagrams detailing imaging optics included in the MC-WSS 122 of FIG. 4A. FIG. 4B is a view corresponding to the y-z plane, while FIG. 4C is a view corresponding to the x-z plane. As illustrated in FIG. 4C, in some implementations, splitter/combiner 254 may include a clear region 274 that allows a beam (shown as a series of dotted and dashed arrows from left to right) to pass through splitter/combiner 254 without effect (i.e., without experiencing any loss).

The number and arrangement of elements shown in FIGS. 4A-4C are provided as examples. In practice, MC-WSS 122 may include additional elements, fewer elements, different elements, differently arranged elements, and/or differently sized elements than those shown and/or described in FIGS. 4A-4C.

Some implementations described herein provide a hybrid add/drop device with improved scalability for supporting growth of an optical network (e.g., as compared to a M×N WSS or a MCS), while allowing CDC add/drop to be achieved at an optical node. In some implementations, the hybrid add/drop device includes elements of both a M×N WSS and a MCS in order to provide improved scalability.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A wavelength selective switch, comprising:
a first port array including M (M>1) input ports, each to launch a respective beam of light;
a dispersive element to separate a beam of light, launched by one of the M input ports, into L (L>1) dispersed wavelength channel sub-beams,
the L dispersed wavelength channel sub-beams being separated in a lateral direction;
a switching array to direct the L dispersed wavelength channel sub-beams, each at a respective angle in a vertical direction;
the dispersive element to converge groups of dispersed wavelength channel sub-beams to form X (X≥1) wavelength channel sub-beams,
the groups of dispersed wavelength channel sub-beams being converged with respect to the lateral direction, and
at least one of the L dispersed wavelength channel sub-beams being included in the groups of dispersed wavelength channel sub-beams;
a splitting element to split a wavelength channel sub-beam, of the X wavelength channel sub-beams, into K (K>1) split wavelength channel sub-beams,
the K split wavelength channel sub-beams being split in the lateral direction;
K switching elements, each to direct one of the K split wavelength channel sub-beams at a respective angle in the vertical direction; and
K output ports, each associated with one of the K switching elements.

2. The wavelength selective switch of claim 1, where the K switching elements are included in a K×N switching array and the K output ports are included in an array of K×N output ports.

3. The wavelength selective switch of claim 1, further comprising a lens to convert lateral angles of the K split wavelength channel sub-beams, introduced at the splitting element, into lateral offsets at the K switching elements.

4. The wavelength selective switch of claim 3, where the lens has a focal length, and where the lens is arranged at a distance equal to the focal length from splitting element and at a distance equal to the focal length from the K switching elements.

5. The wavelength selective switch of claim 1, further comprising a set of lenses to create, at the K switching elements and from the K split wavelength channel sub-beams, K replicated images of the wavelength channel sub-beam impinging on the splitting element.

6. The wavelength selective switch of claim 5, where the set of lenses includes a first lens with a first focal length and a second lens with a second focal length,
where the first lens is arranged at the first focal length from the splitting element and the second lens is arranged at the second focal length from the K switching elements, and
where the first lens is separated from the second lens by a distance equal to a sum of the first focal length and the second focal length.

7. The wavelength selective switch of claim 5, where the K replicated images are inverted at the K switching elements as compared to the wavelength channel sub-beam impinging on the splitting element.

8. The wavelength selective switch of claim 1, where at least one of the K switching elements includes a tunable filter.

9. The wavelength selective switch of claim 1, further comprising:
a lens to convert lateral angles of the K split wavelength channel sub-beams, introduced at the splitting element, into lateral offsets at a multi-faceted prism;
the multi-faceted prism to further separate the K split wavelength channel sub-beams at the K switching elements in the lateral direction; and
K lenses optically disposed between the multi-faceted prism and the K switching elements.

10. The wavelength selective switch of claim 1, where the wavelength selective switch is in a co-packaged configuration with another wavelength selective switch such that the wavelength selective switch and the other wavelength selective switch share imaging optics and the dispersive element.

11. An optical device, comprising:
a first port array including a plurality of input ports, each to launch a respective beam of light;
a first dispersive element to separate a beam of light, launched by one of the plurality of input ports, into a plurality of dispersed wavelength channel sub-beams,
the plurality of dispersed wavelength channel sub-beams being separated in a first direction;
a switching array to direct the plurality of dispersed wavelength channel sub-beams, each at a respective angle in a second direction, the second direction being substantially perpendicular to the first direction;

a second dispersive element to converge groups of dispersed wavelength channel sub-beams to form a plurality of wavelength channel sub-beams,
 the groups of dispersed wavelength channel sub-beams being converged with respect to the first direction, and
 the groups of dispersed wavelength channel sub-beams including at least one of the plurality of dispersed wavelength channel sub-beams;

a splitting element to split a wavelength channel sub-beam, of the plurality of wavelength channel sub-beams, into a plurality of split wavelength channel sub-beams,
 the plurality of split wavelength channel sub-beams being split in the first direction;

a plurality of switching elements, each to direct one of the plurality of split wavelength channel sub-beams at a respective angle in the second direction; and a plurality of output ports, each associated with one of the plurality of switching elements.

12. The optical device of claim 11, where the first dispersive element and the second dispersive element are the same dispersive element.

13. The optical device of claim 11, further comprising a lens to convert angles of the plurality of split wavelength channel sub-beams in the first direction into offsets at the plurality of switching elements.

14. The optical device of claim 11, further comprising imaging optics to create, at the plurality of switching elements and from the plurality of split wavelength channel sub-beams, a plurality of replicated images of the wavelength channel sub-beam impinging on the splitting element.

15. The optical device of claim 11, further comprising:
a lens to convert angles of the plurality of split wavelength channel sub-beams in the first direction into offsets at a multi-faceted prism in the first direction;
the multi-faceted prism to further separate the plurality of split wavelength channel sub-beams at the plurality of switching elements in the first direction; and
a plurality of lenses optically disposed between the multi-faceted prism and the plurality of switching elements.

16. A wavelength selective switch, comprising:
K input ports, each to launch one of K wavelength channel sub-beams;

K switching elements, each to direct one of the K wavelength channel sub-beams at a respective angle in a vertical direction, the respective angles in the vertical direction corresponding to respective desired output ports;

a combining element to converge the K wavelength channel sub-beams to form a combined wavelength channel sub-beam,
 the K wavelength channel sub-beams being converged in a lateral direction;

a dispersive element to separate the combined wavelength channel sub-beam, into a set of dispersed wavelength channel sub-beams,
 each of the set of dispersed wavelength channel sub-beams receiving a deviation in a lateral direction corresponding to a respective wavelength;

a switching array to direct the set of dispersed wavelength channel sub-beams, each at a respective angle for coupling to one of M (M>1) output ports;

the dispersive element to converge groups of dispersed wavelength channel sub-beams to form a set of output beams,
 the groups of dispersed wavelength channel sub-beams being converged with respect to the lateral direction; and a set of output ports, each to receive one of the set of output beams,
 the M output ports including the set of output ports.

17. The wavelength selective switch of claim 16, where the K switching elements are included in a K×N (N>1) switching array and the K input ports are included in an array of K×N input ports.

18. The wavelength selective switch of claim 16, further comprising a lens to convert lateral offsets of the K wavelength channel sub-beams into lateral angles at the combining element.

19. The wavelength selective switch of claim 16, further comprising a set of lenses to create, from the K wavelength channel sub-beams, K replicated images of the K wavelength channel sub-beams at the combining element.

20. The wavelength selective switch of claim 16, where at least one of the K switching elements includes a tunable filter.

* * * * *